United States Patent
Miyamoto et al.

(10) Patent No.: US 6,443,575 B1
(45) Date of Patent: Sep. 3, 2002

(54) PROJECTOR WITH INLET FAN, OUTLET FAN AND VENTILATION DUCT STRUCTURE FOR COOLING AN OPTICAL SYSTEM

(75) Inventors: Teruo Miyamoto; Hiroyuki Yahara; Mitsuhiro Kawaguchi; Motoo Takahashi; Tatsuro Hirose; Takaaki Uda, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 85 days.

(21) Appl. No.: 09/638,545

(22) Filed: Aug. 16, 2000

(30) Foreign Application Priority Data

Aug. 26, 1999 (JP) .......................... 11-239188
Nov. 26, 1999 (JP) .......................... 11-335793

(51) Int. Cl.[7] .................. G03B 21/18; G03B 21/16; G03B 21/14
(52) U.S. Cl. .................. 353/58; 353/61; 353/119
(58) Field of Search .......................... 353/119, 52, 57, 353/60, 61, 31, 33; 349/5; 355/30

(56) References Cited

U.S. PATENT DOCUMENTS 5,906,429 A * 5/1999 Mori et al. .................. 362/293
6,007,205 A * 12/1999 Fujimori ..................... 353/57
6,191,843 B1 * 2/2001 Takiguchi .................... 355/30
6,254,238 B1 * 7/2001 Takamatsu ................... 353/61
6,283,614 B1 * 9/2001 Okada et al. ................ 362/294

FOREIGN PATENT DOCUMENTS

| JP | A8114857 | 5/1996 | ........... G03B/21/14 |
| JP | 8-201916 | 8/1996 | ........... G03B/21/16 |
| JP | 9-133911 | 5/1997 | ......... G02F/1/1333 |
| JP | 10-48747 | 2/1998 | ........... G03B/21/16 |
| JP | 10-186517 | 7/1998 | ........... G03B/21/16 |
| JP | 11-39934 | 2/1999 | ........... F21V/29/00 |
| JP | A1152324 | 2/1999 | ............. G02F/1/13 |
| JP | A11119181 | 4/1999 | ............. G02F/1/13 |
| JP | A11160793 | 6/1999 | ........... G03B/21/16 |

* cited by examiner

*Primary Examiner*—Russell Adams
*Assistant Examiner*—Melissa J Koval (57) ABSTRACT

A projecter having a lamp, a lamp box containing the lamp, an outlet fan for discharging air from the lamp box, an optical system member which receives a light beam from the lamp and outputs an image light, an optical system box containing the optical system member, and an inlet fan for blowing outside air into the optical system box. The projector also has a first ventilating duct that directs the outside air blown in by the inlet fan into the lamp box.

19 Claims, 10 Drawing Sheets

PROJECTOR WITH INLET FAN, OUTLET FAN AND VENTILATION DUCT STRUCTURE FOR COOLING AN OPTICAL SYSTEM

BACKGROUND OF THE INVENTION

The present invention relates to a projector for projecting an image onto a screen and, in particular, relates to a structure for cooling an optical system incorporated in the projector.

In a conventional liquid crystal projector, an outlet fan for cooling a lamp of a lamp unit used as a light source and an inlet fan for cooling a liquid crystal light valve are separately provided. In order to suppress the rise in a lamp surface temperature, the outlet fan must run at a high speed. A lamp unit equipped with an outlet fan is disclosed in Japanese Patent Kokai Publication No. 08-114857 published on May 7, 1996, for instance.

The outlet fan running at a high speed, however, produces high noise, which has significantly degraded value that would be added to the product.

A rise in the lamp surface temperature increases the temperature of the liquid crystal light valve and other optical system components, which can degrade the component performance.

SUMMARY OF THE INVENTION

An object of the present invention is to provide a projector that can suppress rise in a lamp surface temperature and a temperature of optical system components, without increasing a running speed of an outlet fan.

According to one aspect o f the present invention, a projector comprises a lamp; a lamp box containing the lamp, an outlet fan for discharging air from the lamp box; an optical system member which receive s a light beam from the lamp and outputs an image light; an optical system box containing the optical system member; an inlet fan for blowing outside air into the optical system box; and a first ventilating duct that directs the outside air blown in by the inlet fan into the lamp box.

According to another aspect of the present invention, a projector for projecting an image displayed by the optical system members, comprises a lamp; an optical system member for receiving a light beam from the lamp; a housing containing the optical system member; an inlet fan; and a ventilating duct which lies substantially parallel to an outer wall of the housing, lets the air blown in by the inlet fan flow along the outer wall of the housing, and directs the air to a periphery of the optical system member through an opening formed in the outer wall of the housing. An inner surface of the outer wall of the ventilating duct is curved in the vicinity of a joint between the ventilating duct and an opening in the housing so that a height of the ventilating duct gradually decreases as a downstream side of the air flow approaches.

According to the present invention, the fan speed does not need to be increased, regardless of increase in lamp cooling efficiency and lamp output. In addition, the fan speed can be lowered. Accordingly, the fan noise can be reduced.

According to the present invention, the housing of the projector can be structured to serve as the whole or a part of a ventilating duct, so that the number of components can be reduced and the manufacturing costs can be suppressed.

According to the present invention, the air entering from the air inlet passes around the lamp and exits from a small opening, so that the cooling efficiency can be improved.

According to the present invention, the development of air stagnation or turbulence in the ventilating duct can be suppressed, and right locations can be appropriately cooled, so that optical elements can be efficiently cooled, suppressing the degradation of components.

BRIEF EXPLANATION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

Embodiment 1

Figure 1:
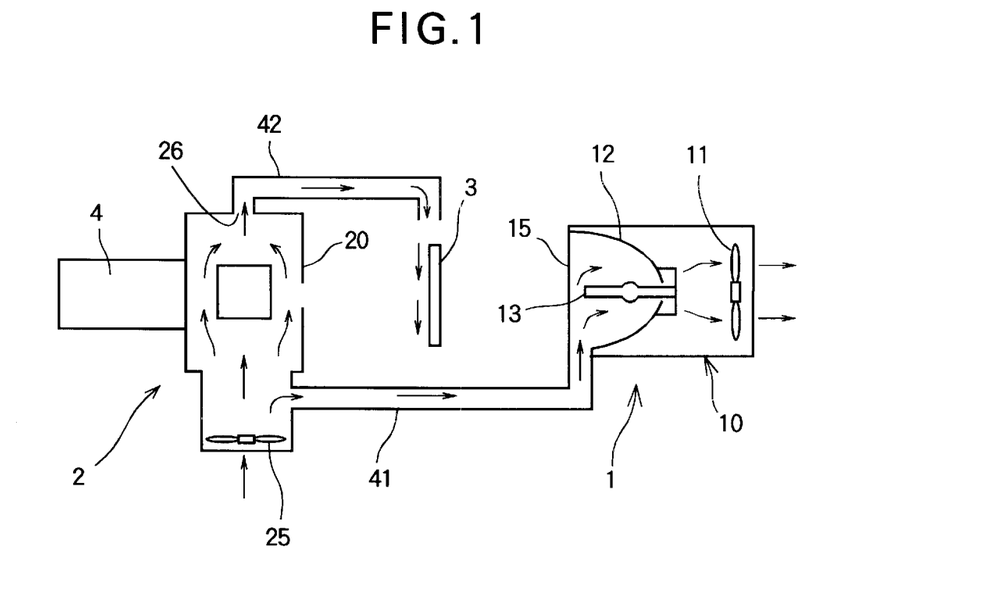
FIG. 1 illustrates the flow of cooling air in the liquid crystal projector according to embodiment 1 of the present invention.
Figure 2:
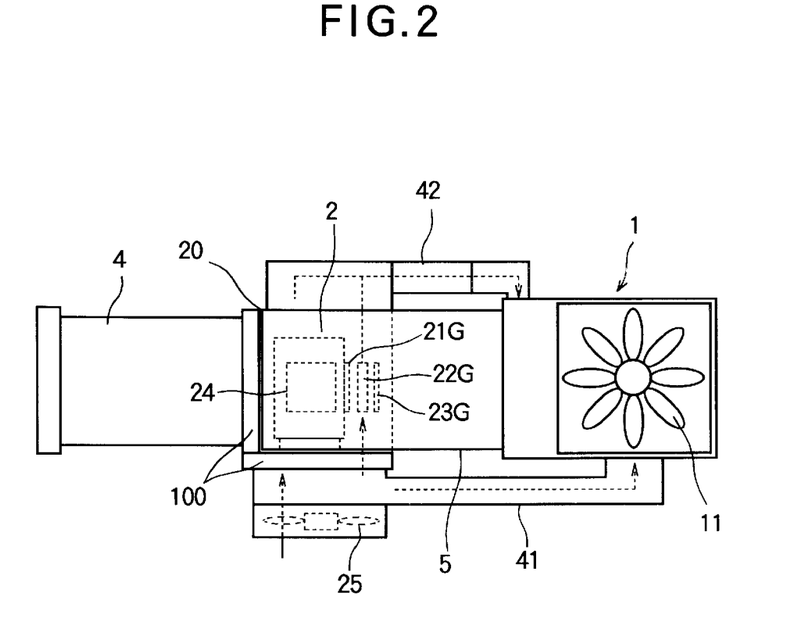
FIG. 2 shows a schematic side view of the liquid crystal projector shown in FIG. 1.
Figure 3:
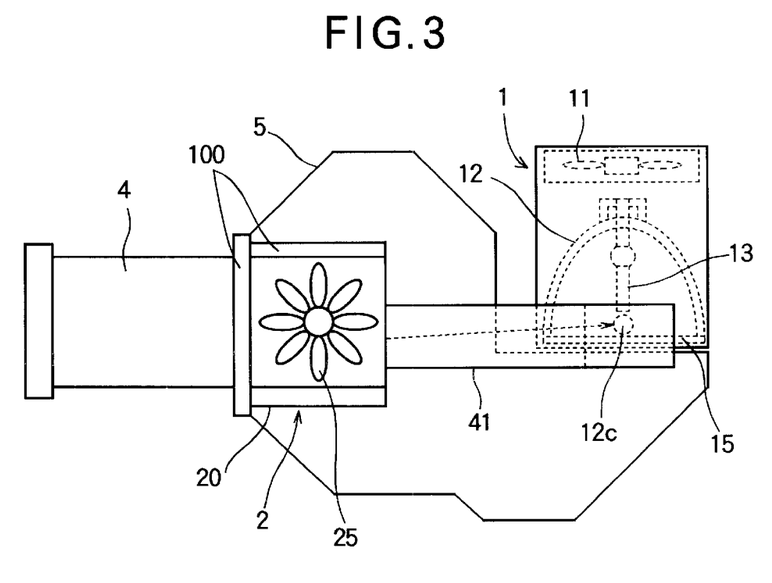
FIG. 3 shows a schematic bottom view of the liquid crystal projector shown in FIG. 1.
Figure 4:
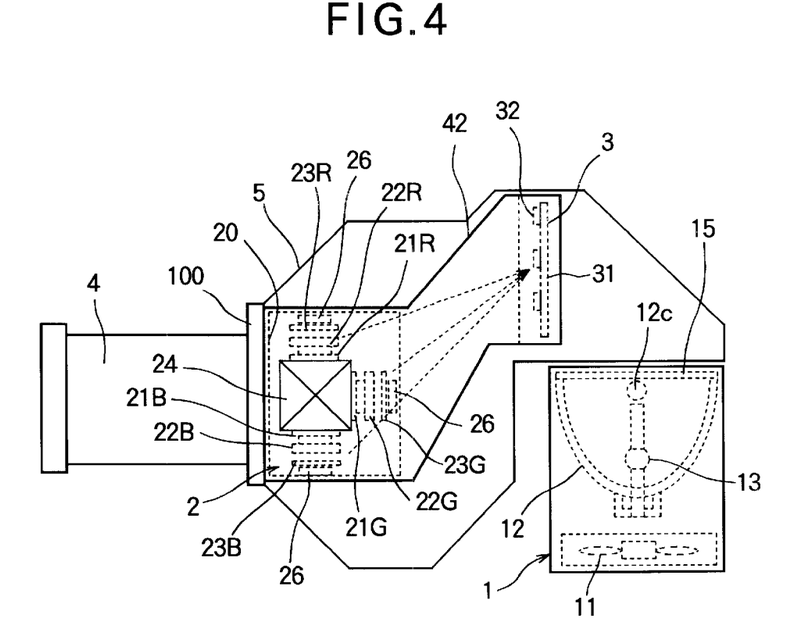
FIG. 4 shows a schematic top view of the liquid crystal projector shown in FIG. 1.

FIG. 1 illustrates the flow of cooling air in the liquid crystal projector of embodiment 1 of the present invention. FIGS. 2, 3, and 4 are respectively schematic side view, bottom view, and top view of the liquid crystal projector shown in FIG. 1.

As shown in FIGS. 1 to 4, the liquid crystal projector of embodiment 1 has a lamp unit 1 as a light source, a liquid crystal light valve 2 that receives light beam coming from the lamp unit 1 and outputs an image light, and an optical element 3 that is disposed o n a light path from the lamp unit 1 to the liquid crystal light valve 2. In FIGS. 1 to 4, a reference numeral 4 denotes a projection lens. In FIGS. 2, 3, and 4, a reference numeral 5 denotes a housing of the optical system of the liquid crystal projector, and a reference numeral 100 denotes a supporting frame.

Figure 5:
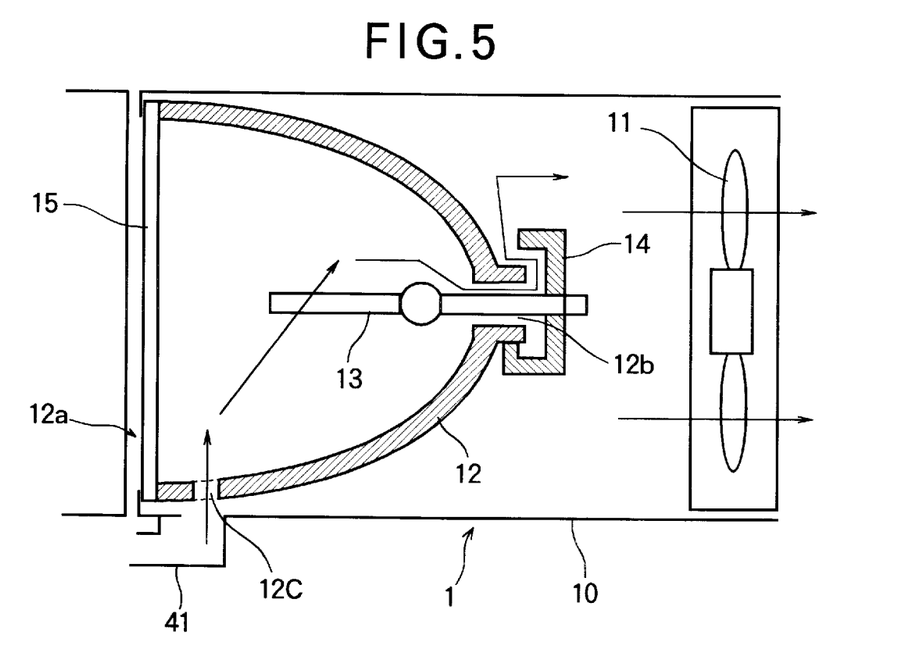
FIG. 5 shows a schematic sectional view of the structure of the lamp unit in the liquid crystal projector shown in FIG. 1.
Figure 6:
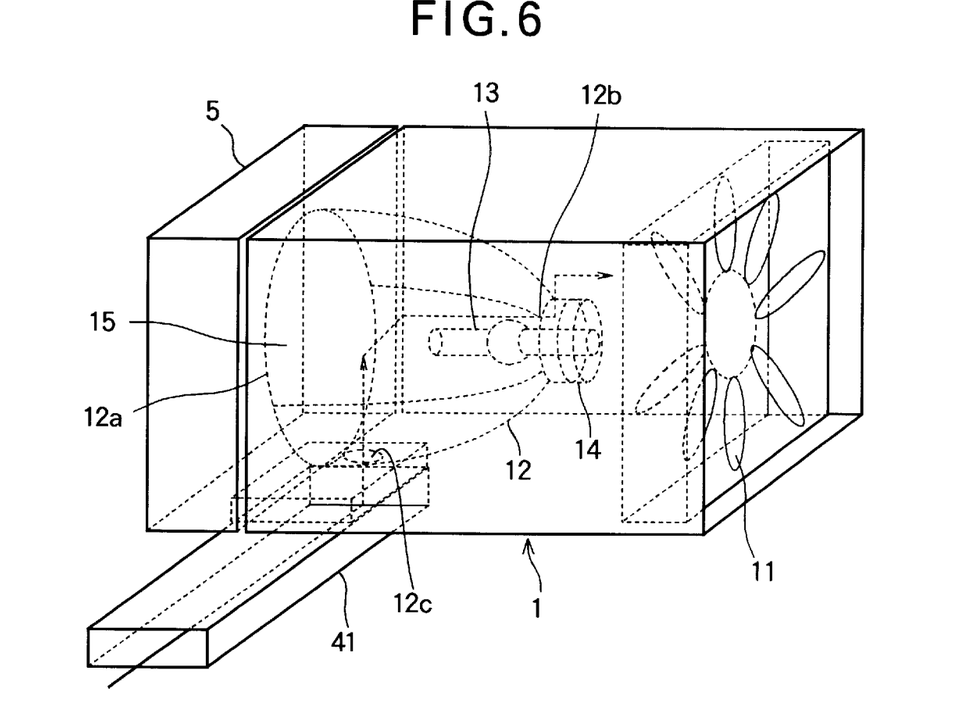
FIG. 6 shows a schematic perspective view of the internal structure of the lamp unit and the structure of the first ventilating duct of the liquid crystal projector shown in FIG. 1.

FIG. 5 is a schematic sectional view of internal structure of the lamp unit 1 of the liquid crystal projector shown in FIG. 1. FIG. 6 is a schematic perspective view of internal structure of the lamp unit 1 and structure of the ventilating duct, which will be described later, in the liquid crystal projector shown in FIG. 1.

As shown in FIGS. 1 to 6, the lamp unit 1 has a lamp box 10, an outlet fan 11 that discharges air inside the lamp box 10, a reflecting mirror 12 provided in the lamp box 10, a lamp 13 provided in the reflecting mirror 12, a supporting member 14 that secures the lamp 13 to the reflecting mirror 12, and a transmissive explosion-proof glass 15 that blocks (or covers) a large opening 12a of the reflecting mirror 12. The reflecting mirror 12 has a small opening 12b used to mount the lamp 13 and an air inlet 12c. With this configuration, the air entering from the air inlet 12c passes around the lamp 13 and exits from the small opening 12b, so that the cooling efficiency for the lamp 13 can be improved.

As the outlet fan 11, an axial fan is recommended, but a sirocco fan (multi-blade fan) having a large static pressure may also be used. The reflecting mirror 12 is a concave mirror, which is, for instance, a spheroidal mirror or parabolic mirror. In addition, the lamp 13 is held by the supporting member 14 in such a manner that a part of the small opening 12b of the reflecting mirror 12 is blocked. The air inlet 12c is disposed somewhere between the large opening 12a and a center position of the lamp 13. The configuration of the lamp unit 1 is not limited to that described above.

As shown in FIG. 4, the liquid crystal light valve 2 has an optical system box 20 comprising walls of an optical system housing 5 and a supporting frame 100, which are combined in a box shape, first polarizers 21R, 21G, and 21B, liquid crystal panels 22R, 22G, and 22B, and second polarizers 23R, 23G, and 23B, for red, green, and blue, the optical prism 24, and the inlet fan 25 for blowing outside air into the optical system box 20. The optical system box 20 has a function to hold the lens and prism. The optical system box 20 has cooling air transfer grilles 26 formed in the vicinity of areas directly below the first and second polarizers and the liquid crystal light valve 21R, 22R, 23R, 21G, 22G, 23G, 21B, 22B, and 23B. As the inlet fan 25, an axial fan is recommended, but a sirocco fan (multi-blade fan) having a large static pressure may also be used. The configuration of the liquid crystal light valve 2 may be different from that described above, and such different configuration would be satisfactory if it has functions to receive the light beam coming from the lamp unit 2 and to project an image.

As shown in FIG. 4, the optical element 3 comprises a substrate 31 and a resin film 32.

The liquid crystal projector of embodiment 1 further comprises a first ventilating duct 41 which directs the air blown in from the outside of the apparatus by the inlet fan 25, into the reflecting mirror 12 of the lamp box 10 and a second ventilating duct 42 which directs the air blown into the optical system box 20 by the inlet fan 25, round the optical element 3.

Figure 7:
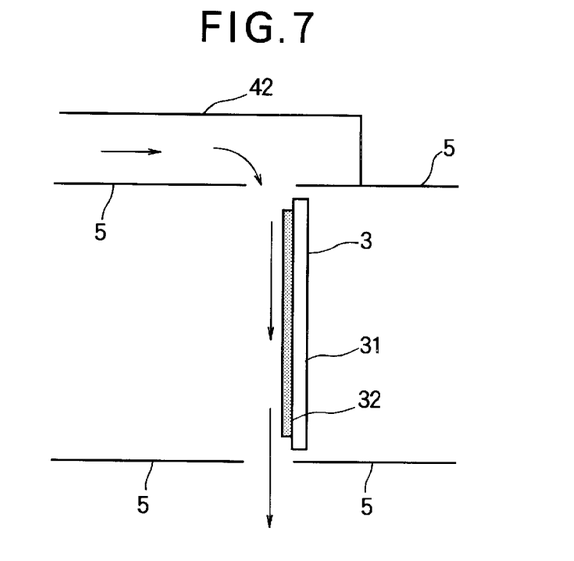
FIG. 7 illustrates the flow of cooling air around the optical element of the liquid crystal projector shown in FIG. 1.

In the liquid crystal projector of embodiment 1, which is configured as described, the use of the air blown in by the inlet fan 25 is not limited to the cooling of the liquid crystal light valve 2. As shown in FIG. 1, a part of the air blown in by the inlet fan 25 enters the first ventilating duct, passes the air inlet 12c, enters the reflecting mirror 12, goes around the lamp 13 (removing the heat of the lamp 13) exits from the small opening 12b of the reflecting mirror 12, and is blown out by the outlet fan 11 of the lamp box 10. As shown in FIGS. 1 and 7, the air which was blown in by the inlet fan 25 and used to cool the liquid crystal light valve 2 is sent through the second ventilating duct 42 to the periphery of the optical element 3 and is used for forced-air cooling of the optical element 3.

In the configuration as described above, the lamp 13 can be cooled by using the pressure of cooling air blown in by the inlet fan 25 while the cooling in the prior art configuration depends on the outlet fan 11 only. Accordingly, the efficiency of cooling the lamp 13 becomes higher than the efficiency of cooling the lamp 13 just by the outlet fan 11, and the output of the lamp 13 can be increased without increasing the running speed of the outlet fan 11, so that the noise produced by the outlet fan 11 can be reduced.

Figure 8:
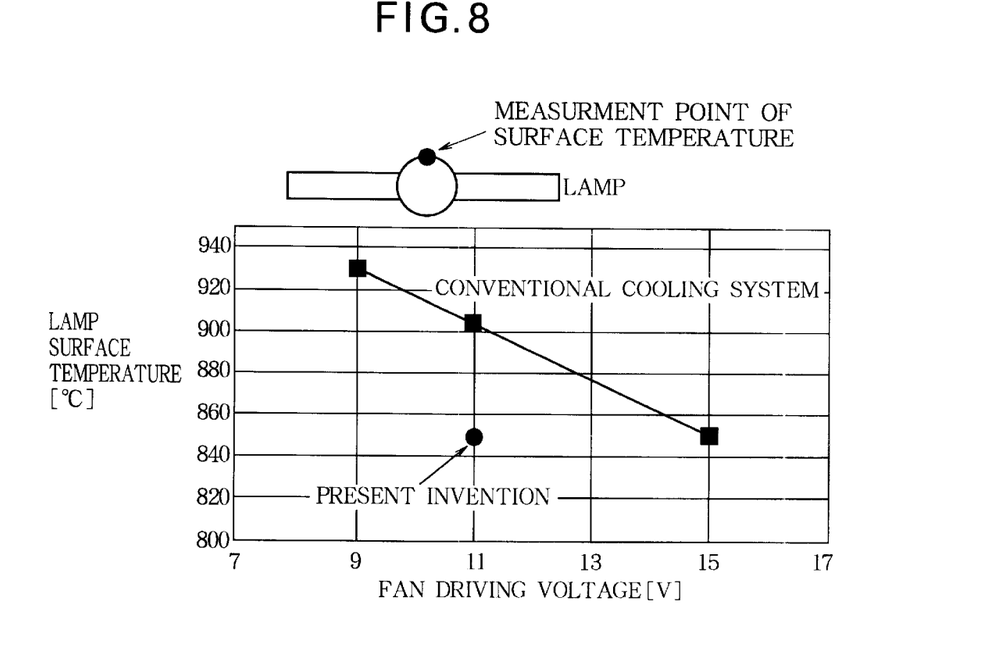
FIG. 8 compares the relationship between the measured outlet fan driving voltage and lamp surface temperature of the liquid crystal projector shown in FIG. 1 and of the conventional liquid crystal projector without the first ventilating duct.

FIG. 8 compares the relationship between the measured outlet fan driving voltage and lamp surface temperature of the liquid crystal projector shown in FIG. 1 and of the conventional liquid crystal projector without the first ventilating duct. If the lamps of the same output power are used for comparison, the cooling system of the present invention can keep almost the same lamp surface temperature at a lower fan driving voltage than the conventional system. In other words, if the fan driving voltage is the same, the lamp surface temperature can be kept to almost the same level, regardless of whether the lamp output is larger than that of the conventional system. Since the fan running speed is almost proportional to the fan driving voltage, the system of the present invention offers equal cooling efficiency at about 70% of the running speed of the conventional system. The relationship between the fan noise and fan running speed is expressed as follows:

$$L_2 = L_1 + 60 \log_{10}(N_2/N_1)$$

where $N_1$, and $N_2$ are values of fan running speed, and $L_1$, and $L_2$ are noise values at fan running speed of $N_1$, and $N_2$. Accordingly, a running speed ratio of 70% decreases the fan noise by about 9.3 dB.

The configuration described above has one optical element 3 and one lamp unit 1, but there may be two of them each. In that case, the number of branches of the ventilating duct must be increased according to the number of objects to be cooled.

Embodiment 2

Figure 9:
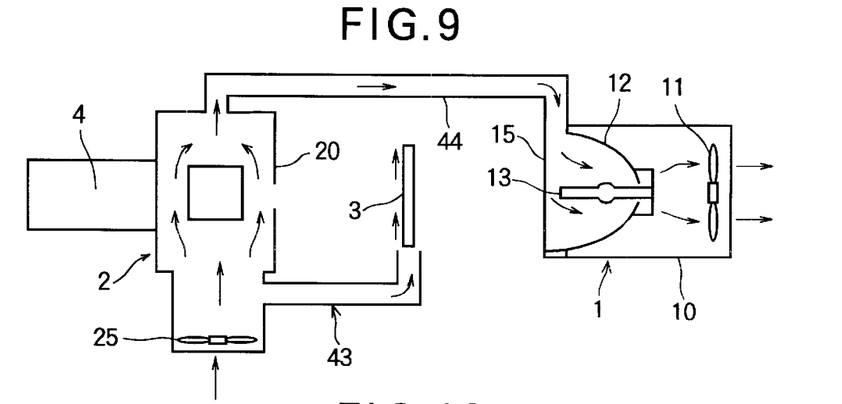
FIG. 9 illustrates the flow of cooling air in the liquid crystal projector of embodiment 2 of the present invention.

FIG. 9 illustrates the flow of cooling air in the liquid crystal projector of embodiment 2 of the present invention. As shown in FIG. 9, the ventilating ducts 43 and 44 may be configured so that the air blown in by the inlet fan 25 is supplied to the periphery of the liquid crystal light valve 2 and optical element 3 (parallel connection), and the air passing the optical system box 20 of the liquid crystal light valve 2 is supplied into the lamp box 10 (serial connection). Except for the above points, the liquid crystal projector of embodiment 2 is the same as that of embodiment 1.

Embodiment 3

Figure 10:
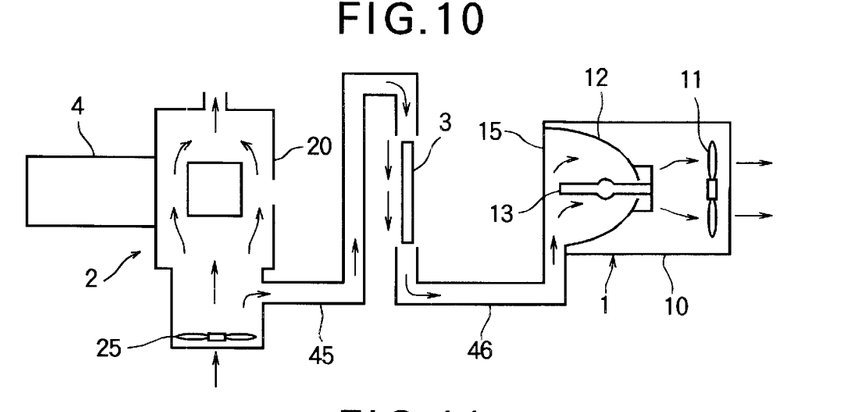
FIG. 10 illustrates the flow of cooling air in the liquid crystal projector of embodiment 3 of the present invention.

FIG. 10 illustrates the flow of cooling air in the liquid crystal projector of embodiment 3 of the present invention. As shown in FIG. 10, the ventilating ducts 45 and 46 may be configured so that the air blown in by the inlet fan 25 is supplied to the periphery of the liquid crystal light valve 2 and optical element 3 (parallel connection), and the air passing around the optical element 3 is supplied into the lamp box 10 (serial connection) Except for the above points, the liquid crystal projector of embodiment 3 is the same as that of embodiment 1.

Embodiment 4

Figure 11:
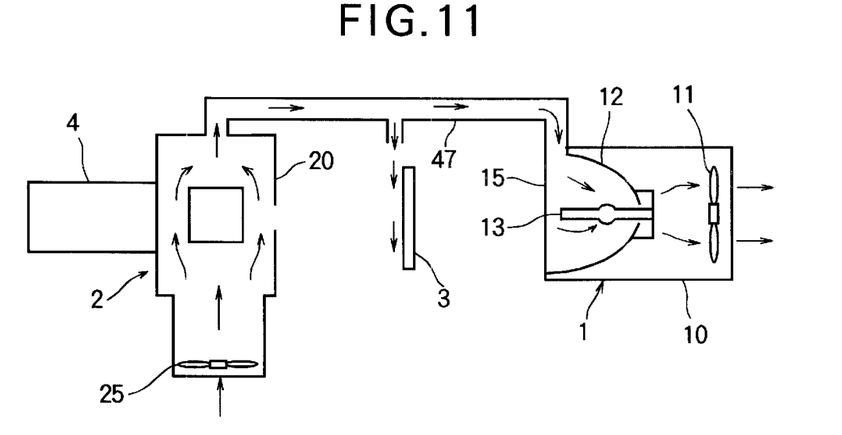
FIG. 11 illustrates the flow of cooling air in the liquid crystal projector of embodiment 4 of the present invention.

FIG. 11 illustrates the flow of cooling air in the liquid crystal projector of embodiment 4 of the present invention. As shown in FIG. 11, the ventilating duct 47 may be configured so that the air which is blown in by the inlet fan 25 and is passing the optical system box 20 of the liquid crystal light valve 2 is supplied to the periphery of the optical element 3 and into the lamp box 10. Except for the above points, the liquid crystal projector of embodiment 4 is the same as that of embodiment 1.

Embodiment 5

Figure 12:
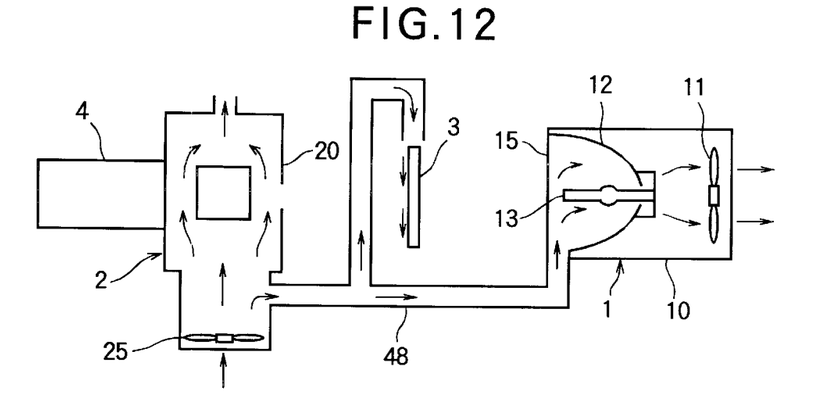
FIG. 12 illustrates the flow of cooling air in the liquid crystal projector of embodiment 5 of the present invention.

FIG. 12 illustrates the flow of cooling air in the liquid crystal projector of embodiment 5 of the present invention. As shown in FIG. 12, the ventilating duct 48 may be configured so that the air blown in by the inlet fan 25 is supplied to the liquid crystal light valve 2, to the periphery of the optical element 3, and into the lamp box 10 in parallel. Except for the above points, the liquid crystal projector of embodiment 5 is the same as that of embodiment 1.

Embodiment 6

Figure 13:
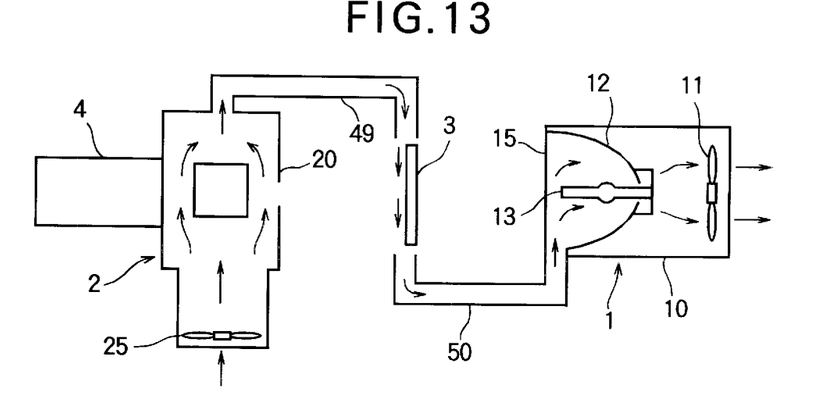
FIG. 13 illustrates the flow of cooling air in the liquid crystal projector of embodiment 6 of the present invention.

FIG. 13 illustrates the flow of cooling air in the liquid crystal projector of embodiment 6 of the present invention. As shown in FIG. 13, the ventilating ducts 49 and 50 may be configured so that the air which is blown in by the inlet fan 25 and is passing the optical system box 20 of the liquid crystal light valve 2 is supplied to the periphery of the optical element 3, and the air passing around the optical element 3 is supplied into the lamp box 10. Except for the above points, the liquid crystal projector of embodiment 6 is the same as that of embodiment 1.

Embodiment 7

Figure 14:
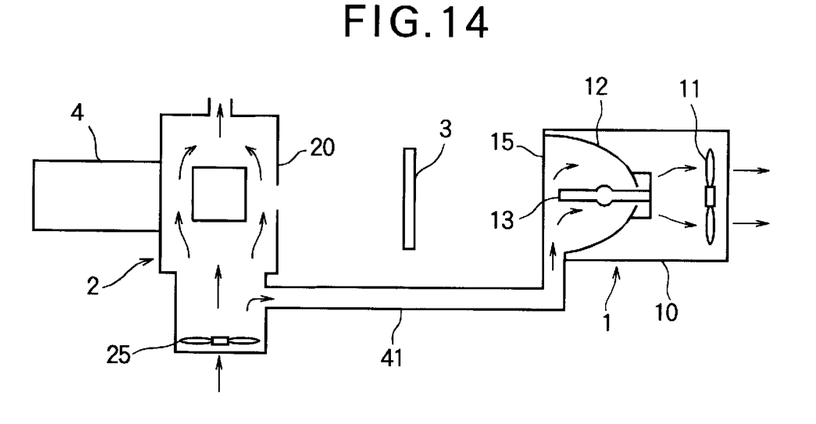
FIG. 14 illustrates the flow of cooling air in the liquid crystal projector of embodiment 7 of the present invention.
Figure 15:
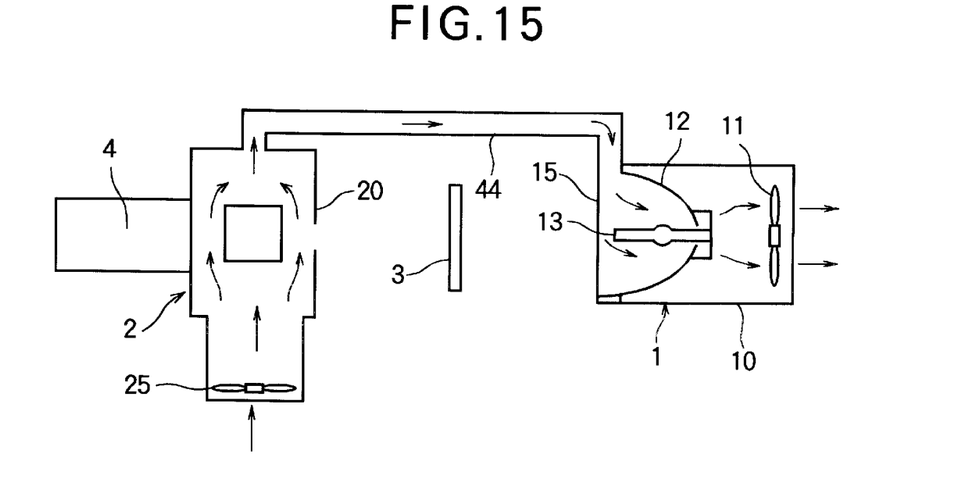
FIG. 15 illustrates the flow of cooling air in the liquid crystal projector of embodiment 7 of the present invention.

FIGS. 14 and 15 illustrate the flow of cooling air in the liquid crystal projector of embodiment 7 of the present, invention. As shown in FIG. 14 or 15, the ventilating duct for directing air to the optical element 3 may be omitted. Except for the above points, the liquid crystal projector of embodiment 7 is the same as that of embodiment 1.

Embodiment 8

Figure 16:
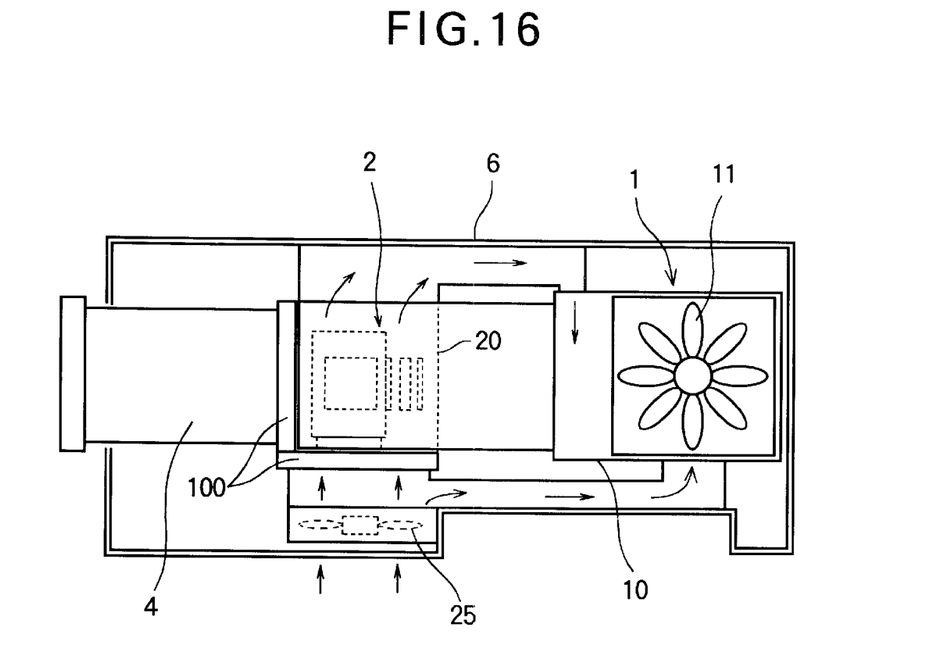
FIG. 16 illustrates the flow of cooling air in the liquid crystal projector of embodiment 8 of the present invention.

FIG. 16 illustrates the flow of cooling air in the liquid crystal projector of embodiment 8 of the present invention. In FIG. 16, the same reference numerals are given to the parts which are the same as or equivalent to the corresponding parts of embodiment 1. In FIG. 16, reference numeral 6 denotes the housing of the liquid crystal projector. As shown in FIG. 16, the housing 6 of the projector may serve as a part of the ventilating duct of embodiments 1 to 7. This reduces the number of components. The ventilating duct may be configured not only by the housing but also by the optical system housing 5, a printed circuit board, or another structure. Except for the above points, the liquid crystal projector of embodiment 8 is the same as that of embodiment 1.

Embodiment 9

Figure 17:
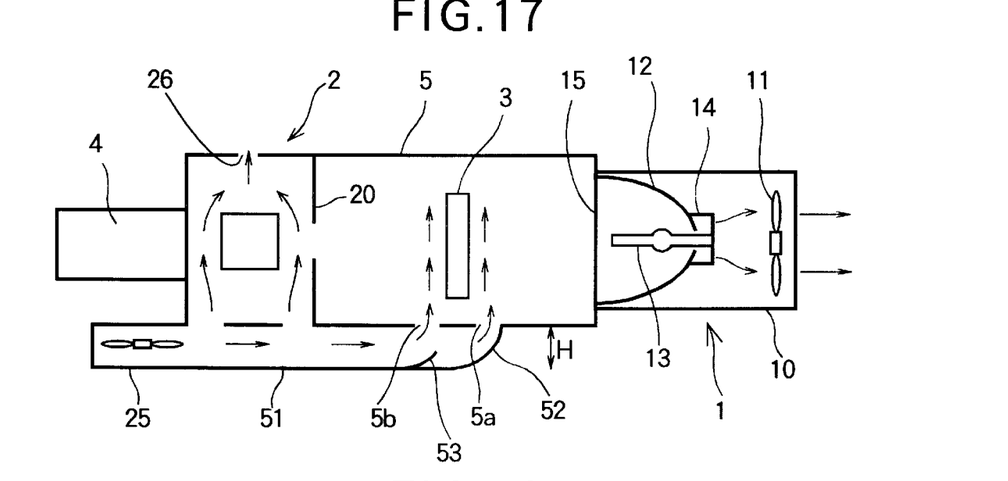
FIG. 17 schematically shows the configuration of the liquid crystal projector of embodiment 9 of the present invention.
Figure 18:
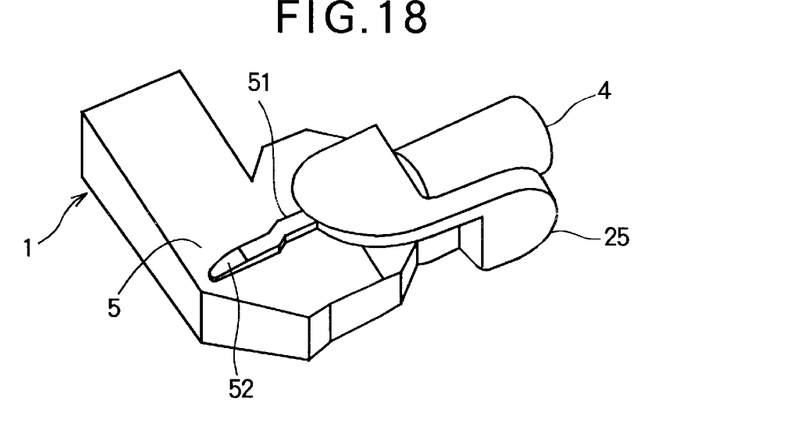
FIG. 18 is a schematic perspective view of the bottom of the liquid crystal projector shown in FIG. 17.
Figure 19:
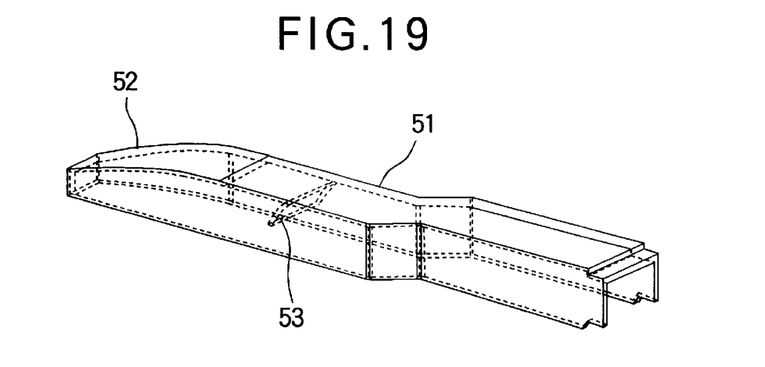
FIG. 19 is an enlarged perspective view of the ventilating duct shown in FIG. 17.

FIG. 17 schematically shows the configuration of the liquid crystal projector of embodiment 9 of the present invention. FIG. 18 is a schematic perspective view of the bottom of the liquid crystal projector shown in FIG. 17. FIG. 19 is an enlarged perspective view of the ventilating duct shown in FIG. 17.

As shown in FIGS. 17, 18, and 19, the liquid crystal projector of embodiment 9 comprises a lamp unit 1 as a light source, a liquid crystal light valve 2 that receives light beam coming from the lamp unit 1 and outputs an image light, and an optical element 3 disposed on a light path from the lamp unit 1 to the liquid crystal light valve 2. In FIGS. 17 and 18, a reference numeral 4 denotes a projection lens. In FIG. 17, a reference numeral 5 denotes the optical system housing of the liquid crystal projector.

The lamp unit 1 comprises a lamp box 10, an outlet fan 11 for discharging the air from the lamp box 10, a reflecting mirror 12 disposed in the lamp box 10, a lamp 13 disposed in the reflecting mirror 12, a supporting member 14 that secures the lamp 13 to the reflecting mirror 12, and a transmissive explosion-proof glass 15 which blocks (or covers) a large opening of the reflecting mirror 12. The reflecting mirror 12 has a small opening for mounting the lamp 13 and an air inlet.

The liquid crystal projector of embodiment 9 of the present invention comprises an optical system box 20, a first polarizer, a liquid crystal panel, a second polarizer, an optical prism (which are not shown in FIG. 17), and an inlet fan 25 for blowing the outside air into the optical system box 20. In the optical system box 20, a cooling air transfer grille 26 is formed. As the inlet fan 25, a sirocco fan (multi-blade fan) is recommended, but an axial fan may also be used.

As shown in FIGS. 17, 18, and 19, the liquid crystal projector of embodiment 9 has a ventilating duct 51 that lies substantially parallel to an outer wall (bottom) of the housing 5, lets the outside air blown in by the inlet fan 25 flow along the outer wall of the housing 5, and directs the outside air through the opening 5a formed in the outer wall of the housing 5, to the periphery of the optical element 3. The inner surface of the outer wall of the ventilating duct 51 is curved (reference numeral 52) in the vicinity of a joint between the housing 5 and the opening 5a, in such a manner that a height H of the ventilating duct 5 gradually decreases as the downstream side of the air flowing along the outer wall of the housing 5 approaches. The surface is curved also in such a manner that the width of the ventilating duct 51 gradually narrows as the downstream side of the air flowing along the outer wall of the housing 5 approaches. In comparison with the ventilating duct 50 having a square-cornered area, this configuration is resistant to air stagnation (where air flow becomes sluggish), and the development of air turbulence can be suppressed.

As shown in FIGS. 17 and 19, the liquid crystal projector of embodiment 9 is equipped with a plate-like member 53 for directing a part of the air blown in by the inlet fan 25 and flowing along the outer wall of the housing 5, into the housing 5 through the opening 5b, in an inside of the ventilating duct 51. The plate-like member 53 is also curved to become gradually closer to the outer wall of the housing 5 as the downstream side of the air flowing along the outer wall of the housing 5 approaches. Further, since the plate-like member 53 is formed to block part (50%, for instance) of the height H of the ventilating duct 51, the air flow can be divided into two parts, one along the outer wall of the housing 5 and the other into the housing 5. With the plate-like member 53, much air can be supplied to right places. Since the plate-like member 53 is curved, the development of air stagnation and air turbulence can be suppressed.

As has been described above, the projector of embodiment 9 can suppress the development of air stagnation and turbulence and can appropriately cool right places, so that the optical element 3 can be efficiently cooled, suppressing component degradation.

A configuration same as the ventilating duct 51 can be applied to embodiments 1 to 8 described above. Embodiment 9 is configured in the same manner as embodiments 1 to 8, except for the point described above.

Embodiment 10

Figure 20:
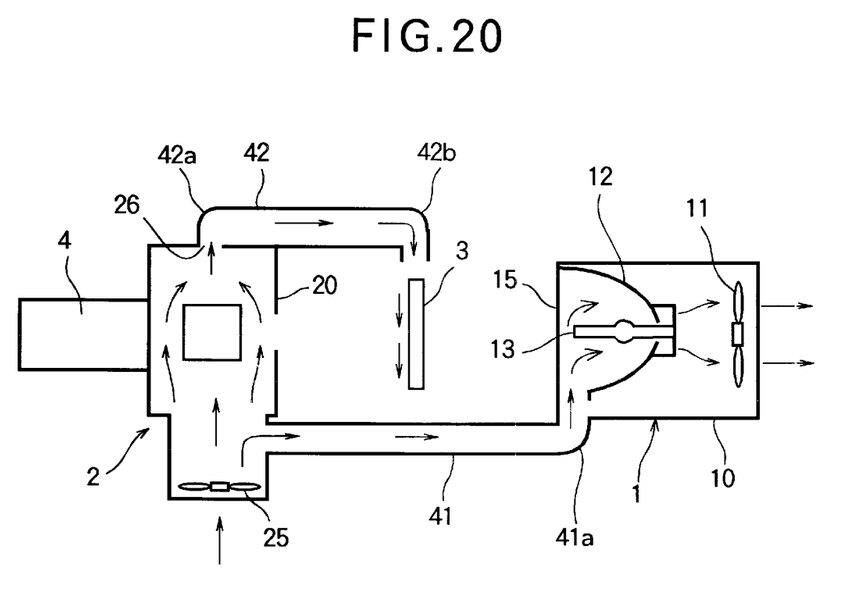
FIG. 20 schematically shows the configuration of the liquid crystal projector of embodiment 10 of the present invention.

FIG. 20 schematically shows the configuration of the liquid crystal projector of embodiment 10 of the present invention. The liquid crystal projector of embodiment 10 is different from that of embodiment 1 described above only in that the square-cornered areas of the ventilating ducts 41 and 42 are replaced by the curved portions 41a, 42a, and 42b, as in the ventilating duct 51 of embodiment 9. With this configuration, the development of air stagnation or turbulence can be suppressed, the optical element 3 and lamp can be efficiently cooled, and component degradation can be suppressed. Except for the above points, the liquid crystal projector of embodiment 10 is the same as that of embodiment 1.

Embodiment 11

Figure 21:
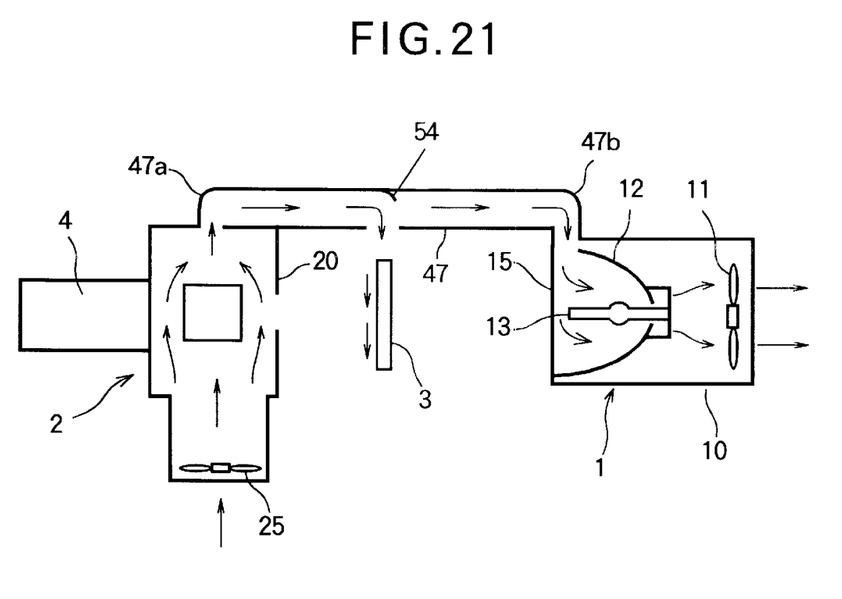
FIG. 21 schematically shows the configuration of the liquid crystal projector of embodiment 11 of the present invention.

FIG. 21 schematically shows the configuration of the liquid crystal projector of embodiment 11 of the present invention. The liquid crystal projector of embodiment 11 is different from that of embodiment 4 described above in that the square-cornered portions of the ventilating duct 47 are replaced by the curved portions 47a and 47b, as in the ventilating duct 51 of embodiment 9 and that the plate-like member 54 is provided in an inside of the ventilating duct 47 in order to direct a part of the air blown in by the inlet fan 25 and flowing along the outer wall of the housing 5 into the housing 5. With this configuration, the development of air stagnation and turbulence can be suppressed, and right places can be appropriately cooled, so that the optical element 3 and lamp can be efficiently cooled, suppressing component degradation. Except for the above points, the liquid crystal projector of embodiment 11 is the same as that of embodiment 1.

Embodiment 12

Figure 22:
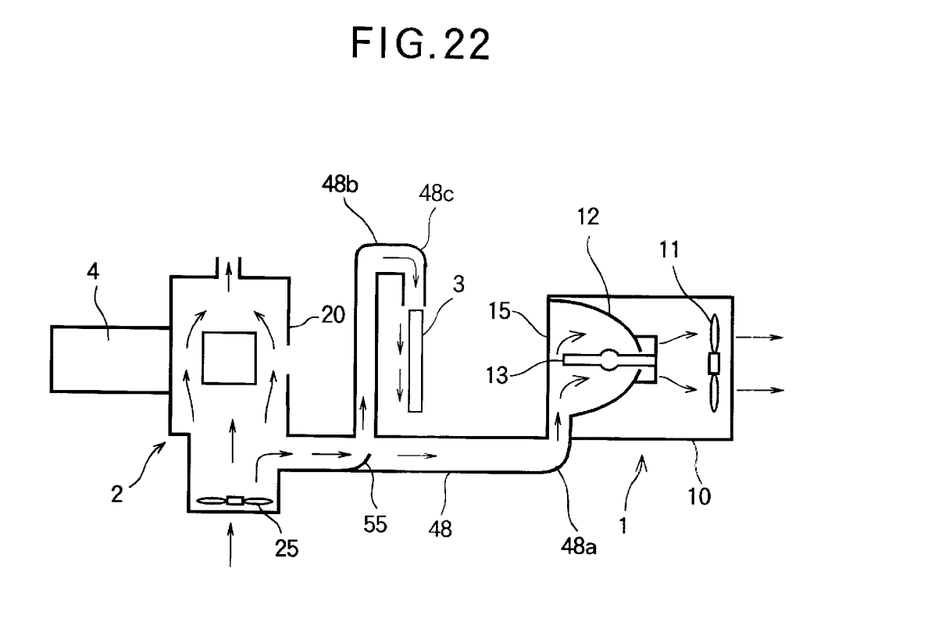
FIG. 22 schematically shows the configuration of the liquid crystal projector of embodiment 12 of the present invention.

FIG. 22 schematically shows the configuration of the liquid crystal projector of embodiment 12 of the present invention. The liquid crystal projector of embodiment 12 is different from that of embodiment 5 described above in that the square-cornered portions of the ventilating duct 48 are replaced by the curved portions 48a, 48b, and 48c, as in the ventilating duct 51 of embodiment 9 and that the plate-like member 55 is disposed in an inside of the ventilating duct 48 in order to direct a part of the air blown in by the inlet fan 25 and flowing along the outer wall of the housing 5 into the housing 5. With this configuration, the development of air stagnation and turbulence can be suppressed and right places can be appropriately cooled, so that the optical element 3 and lamp can be efficiently cooled, suppressing component degradation.

Changing a square-cornered portion of a ventilating duct to a curved portion and providing a plate-like member in the inside of the ventilating duct in order to direct a part of air into the housing can be applied to any of embodiments 1 to 12 described above, and the number and shapes of curved portions and the number and shapes of plate-like members can be freely specified according to the shapes, positions, heat resistance, and other factors of optical system members such as the optical element and liquid crystal panel. Except for the above points, the liquid crystal projector of embodiment 12 is the same as that of embodiment 1.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A projector comprising:
   a lamp;
   a lamp box containing said lamp;
   an outlet fan for discharging air from said lamp box;
   an optical system member which receives a light beam from said lamp and outputs an image light;
   an optical system box containing said optical system member;
   an inlet fan for blowing outside air into said optical system box; and
   a first ventilating duct which directs the outside air blown in by said inlet fan into said lamp box.

2. The projector according to claim 1, further comprising:
   an optical element disposed on a light path from said lamp to said optical system member; and
   a second ventilating duct which directs the outside air blown in by said inlet fan to a periphery of said optical element.

3. The projector according to claim 1, wherein said first ventilating duct directs air, which is placed upstream from said optical system box, to said lamp box.

4. The projector according to claim 1, wherein said first ventilating duct directs air, which has passed said optical system box, to said lamp box.

5. The projector according to claim 2, wherein said second ventilating duct directs air, which is placed upstream from said optical system box, to a periphery of said optical element.

6. The projector according to claim 2, wherein said second ventilating duct directs air, which has passed said optical system box, to a periphery of said optical element.

7. The projector according to claim 1, further comprising a housing containing said lamp box and said optical system box, said housing serving as a part of said first ventilating duct.

8. The projector according to claim 2, further comprising a housing containing said lamp box and said optical system box, said housing serving as a part of said second ventilating duct.

9. The projector according to claim 2, further comprising a housing containing said lamp box and said optical system box, said housing serving as a part of said first ventilating duct and a part of said second ventilating duct.

10. The projector according to claim 1, further comprising:
    a reflecting mirror having a large opening for emitting light and a small opening for holding the lamp, which is disposed to surround said lamp;

a transmissive protection plate which blocks said large opening; and an air inlet disposed on said reflecting mirror and connected to said first ventilating duct;

wherein the air blown in by said inlet fan through said first ventilating duct into said reflecting mirror passes said small opening and said lamp box and exits from said outlet fan.

11. The projector according to claim 1, further comprising a housing containing said optical system box;

wherein said first ventilating duct is formed to lie substantially parallel to an outer wall of said housing, lets the air blown in by said inlet fan flow along the outer wall of said housing, and directs the air into said lamp box via an opening formed in said lamp box; and an inner surface of the outer wall of said first ventilating duct is curved in the vicinity of a joint between said first ventilating duct and the opening of said lamp box so that a height of said first ventilating duct gradually decreases as a downstream side of the air flow approaches.

12. The projector according to claim 11, wherein a plate-like member is disposed in an inside of said first ventilating duct in order to direct a part of the air blown in by said inlet fan and flowing along the outer wall of said housing into said housing.

13. The projector according to claim 2, further comprising a housing containing said lamp box;

wherein said second ventilating duct is formed to lie substantially parallel to an outer wall of said housing and to direct the air blown in by said inlet fan along the outer wall of said housing to a periphery of said optical element through an opening formed in said housing; and the inner surface of the outer wall of said second ventilating duct is curved in the vicinity of a joint between said second ventilating duct and an opening in said housing so that the height of said second ventilating duct gradually decreases as a downstream side of the air flow approaches.

14. The projector according to claim 13, wherein a plate-like member is disposed in an inside of said second ventilating duct so that a part of the air blown in by said inlet fan and flowing along the outer wall of said housing is directed into said housing.

15. A projector for projecting an image displayed by said optical system members, comprising:

a lamp, encompassed by a lamp box;

an outlet fan for discharging air from said lamp box;

an optical system member for receiving a light beam from said lamp;

a housing containing said optical system member;

an inlet fan; and a ventilating duct which lies substantially parallel to an outer wall of said housing, lets the air blown in by said inlet fan flow along the outer wall of said housing, and directs the air to a periphery of said optical system member through an opening formed in the outer wall of said housing;

wherein an inner surface of the outer wall of said ventilating duct is curved in the vicinity of a joint between said ventilating duct and an opening in said housing so that a height of said ventilating duct gradually decreases as a downstream side of the air flow approaches.

16. The projector according to claim 15, wherein a plate-like member is disposed in an inside of said ventilating duct, in order to direct a part of the air blown in by said inlet fan and flowing along the outer wall of said housing into said housing.

17. A method of cooling a device, comprising the steps of:

providing an inlet fan wherein the inlet fan draws air into the device;

providing at least one ventilating air duct which channels the air drawn in by the inlet fan to at least one predetermined region of the device; and providing an outlet fan for discharging the air from the device;

wherein the inlet fan and the outlet fan act together to create a current of air which continuously flows through the device in a predetermined manner.

18. The method of claim 17, wherein the at least one ventilating air duct is comprised of at least one outer wall of the device and at least one separate inner wall.

19. The method of claim 17, wherein an opening within the at least one ventilating duct directs air flow to a specific section of the predetermined region.

* * * * *